US 12,112,217 B2

(12) United States Patent
Lee et al.

(10) Patent No.: US 12,112,217 B2
(45) Date of Patent: Oct. 8, 2024

(54) ELECTRONIC CARD RECEIVING DEVICE AND METHOD OF USING ELECTRONIC CARD RECEIVING DEVICE

(71) Applicant: E Ink Holdings Inc., Hsinchu (TW)

(72) Inventors: Huei-Chuan Lee, Hsinchu (TW); Bo-Tsang Huang, Hsinchu (TW); Chu-Kuang Tseng, Hsinchu (TW); Chin-Chi Yu, Hsinchu (TW); Chih-Chun Chen, Hsinchu (TW); Kai-Yi Cho, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/076,393

(22) Filed: Dec. 7, 2022

(65) Prior Publication Data

US 2023/0237294 A1    Jul. 27, 2023

(30) Foreign Application Priority Data

Jan. 24, 2022  (TW) .................................. 111102824

(51) Int. Cl.
*G06K 13/08* (2006.01)
*G06K 7/04* (2006.01)

(52) U.S. Cl.
CPC ............. *G06K 13/085* (2013.01); *G06K 7/04* (2013.01)

(58) Field of Classification Search
CPC ...... G06K 13/085; G06K 7/04; G06K 7/0021; G06K 7/0069; G06K 13/08
See application file for complete search history.

(56) References Cited

U.S. PATENT DOCUMENTS

| 5,589,681 | A | 12/1996 | Merlin et al. |
| 6,086,423 | A | 7/2000 | Lotz |
| 6,802,742 | B2 | 10/2004 | Chaillie |
| 2006/0076412 | A1* | 4/2006 | Chen .................. G06K 13/08 235/441 |

FOREIGN PATENT DOCUMENTS

| CN | 205827381 | 12/2016 |
| TW | M419996 | 1/2012 |
| TW | 201205446 | 2/2012 |

* cited by examiner

*Primary Examiner* — Matthew Mikels
(74) *Attorney, Agent, or Firm* — JCIPRNET (57) ABSTRACT

An electronic card receiving device, including a housing, a card stand, a rotating shaft, and a contact element, is provided. The housing includes a front plate having an opening. The card stand is disposed in an inner space of the housing and includes a plate section, a connecting section, and a hook section. The connecting section is connected between the plate section and the hook section. A terminal of the hook section protrudes toward the opening. The rotating shaft is attached to the plate section and is lower than the opening. An axis of the rotating shaft is substantially parallel to the front plate. The rotating shaft rotates to drive the card stand to oscillate between an initial configuration and a card-reading configuration. The contact element is disposed on the plate section of the card stand. A method of using an electronic card receiving device is also provided.

19 Claims, 9 Drawing Sheets

ELECTRONIC CARD RECEIVING DEVICE AND METHOD OF USING ELECTRONIC CARD RECEIVING DEVICE

CROSS-REFERENCE TO RELATED APPLICATION

This application claims the priority benefit of Taiwan application serial no. 111102824, filed on Jan. 24, 2022. The entirety of the above-mentioned patent application is hereby incorporated by reference herein and made a part of this specification.

BACKGROUND

Technical Field

The disclosure relates to an electronic card receiving technology, and more particularly to an electronic card receiving device and a method of using the electronic card receiving device.

Description of Related Art

Electronic cards (for example, credit cards, identity cards, and stand-up cards) have been widely used. Some electronic cards are even equipped with display panels to directly display information on the electronic cards, which enables the electronic cards to be more widely applied. In some applications, the electronic card is read or updated with a contact-type receiving device, which may cause damage to the electronic card. Therefore, a technology that can reduce damage to an electronic card in contact-type reading and updating needs to be proposed.

SUMMARY

The disclosure provides an electronic card receiving device, which can reduce the probability of damage to an electronic card.

The disclosure provides a method of using an electronic card receiving device, which can reduce the degree of wear and tear of an electronic card during use.

An electronic card receiving device according to an embodiment of the disclosure includes a housing, a card stand, a rotating shaft, and a contact element. The housing includes a front plate, and the front plate has an opening. The card stand is disposed in an inner space of the housing. The card stand includes a plate section, a connecting section, and a hook section. The connecting section is connected between the plate section and the hook section, and a terminal of the hook section protrudes toward the opening. The rotating shaft is attached to the plate section of the card stand. The rotating shaft is lower than the opening. An axis of the rotating shaft is substantially parallel to the front plate. Rotation of the rotating shaft drives the card stand to oscillate between an initial configuration and a card-reading configuration. The contact element is disposed on the plate section of the card stand, and the card-reading configuration is such that a top of the contact element is in a contact position and the initial configuration is such that the top of the contact element is lower than the contact position.

In an embodiment of the disclosure, the contact element includes multiple probes, and tips of the probes are substantially coplanar.

In an embodiment of the disclosure, the card-reading configuration is such that the hook section is higher than the contact position.

In an embodiment of the disclosure, the housing includes a blocking protrusion, protruding from the front plate toward the card stand, and a blocking surface of the blocking protrusion is approximately flush with the contact position.

In an embodiment of the disclosure, the card-reading configuration is such that the top of the contact element, the hook section, the blocking protrusion, and the front plate enclose a card receiving space.

In an embodiment of the disclosure, the electronic card receiving device further includes an elastic element, disposed between the housing and the card stand, and the elastic element and the front plate are located on two opposite sides of the card stand.

In an embodiment of the disclosure, the card stand is in the card-reading configuration such that the elastic element is compressed by the card stand.

In an embodiment of the disclosure, the electronic card receiving device further includes a first electromagnet and a second electromagnet, respectively disposed on the housing and the card stand.

In an embodiment of the disclosure, the electronic card receiving device further includes a micro switch, disposed between the housing and the card stand, the micro switch and the opening are located on two opposite sides of the card stand, and the micro switch is suitable for controlling magnetism of the first electromagnet and the second electromagnet.

In an embodiment of the disclosure, the card-reading configuration is such that the micro switch is pressed by the card stand and allows the first electromagnet and the second electromagnet to be excited and attract each other.

In an embodiment of the disclosure, the card stand is in the initial configuration such that the micro switch is not pressed, so that the first electromagnet and the second electromagnet are demagnetized.

In an embodiment of the disclosure, the opening has a first opening portion and a second opening portion, a width of the first opening portion is greater than a width of the second opening portion, and the second opening portion extends downward from the first opening portion.

In an embodiment of the disclosure, the electronic card receiving device further includes a side baffle, disposed between the front plate and the card stand.

In an embodiment of the disclosure, the electronic card receiving device is suitable for receiving an electronic card, and the card-reading configuration allows the card stand to maintain the electronic card between the hook section and the front plate of the housing and enables the contact element to contact the electronic card.

In an embodiment of the disclosure, the electronic card is a passive electronic card, and the electronic card receiving device is suitable for providing an electrical signal to the electronic card through the contact element.

A method of using an electronic card receiving device according to an embodiment of the disclosure includes the following steps. The electronic card receiving device is provided. The electronic card receiving device includes a housing, a card stand, a rotating shaft, and a contact element. The housing includes a front plate, and the front plate has an opening. The card stand is disposed in an inner space of the housing, and the card stand includes a plate section, a connecting section, and a hook section. The connecting section is connected between the plate section and the hook section, and a terminal of the hook section protrudes toward a direction of the opening. The rotating shaft is attached to the plate section of the card stand, the rotating shaft is lower than the opening, and an axis of the rotating shaft is substantially parallel to the front plate. The contact element is disposed on the plate section of the card stand. The electronic card is inserted into the inner space of the housing through the opening. The electronic card is pushed to abut against the hook section to rotate the rotating shaft to drive the card stand to oscillate from an initial configuration to a card-reading configuration, so that a top of the contact element rises to a contact position to contact the electronic card.

In an embodiment of the disclosure, the method of using the electronic card receiving device further includes the following step. The electronic card is pushed through the opening after the card stand is under the card-reading configuration, so that the electronic card leaves the electronic card receiving device through the opening and the rotating shaft is rotated to drive the card stand to oscillate from the card-reading configuration to the initial configuration, so that the top of the contact element is lowered from the contact position and leaves the electronic card.

In an embodiment of the disclosure, the card stand oscillates from the initial configuration to the card-reading configuration to drive the electronic card as a whole to enter the inner space of the housing through the opening and abut between the hook section and the front plate.

In an embodiment of the disclosure, under the card-reading configuration, the electronic card receiving device provides an electrical signal to the electronic card through the contact element.

In an embodiment of the disclosure, the contact element includes multiple probes.

Based on the above, the electronic card receiving device of the embodiments of the disclosure includes the card stand that may oscillate between the initial configuration and the card-reading configuration, and the card stand contacts an electrical contact point of the electronic card only under the card-reading configuration. Therefore, the electrical contact point of the electronic card is not easily worn out by contacting the card stand.

To make the aforementioned more comprehensible, several embodiments accompanied with drawings are described in detail as follows.

BRIEF DESCRIPTION OF THE DRAWINGS

The accompanying drawings are included to provide a further understanding of the disclosure and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

In the following description of the accompanying drawings, X, Y, and Z axes are used to understand the orientation and relative positions of the device and individual components. In some embodiments, the X, Y, and Z axes may be three axes that are perpendicular to each other two by two, but in some embodiments, the X, Y, and Z axes may be three axes that intersect each other two by two but are not necessarily perpendicular.

Figure 1A:
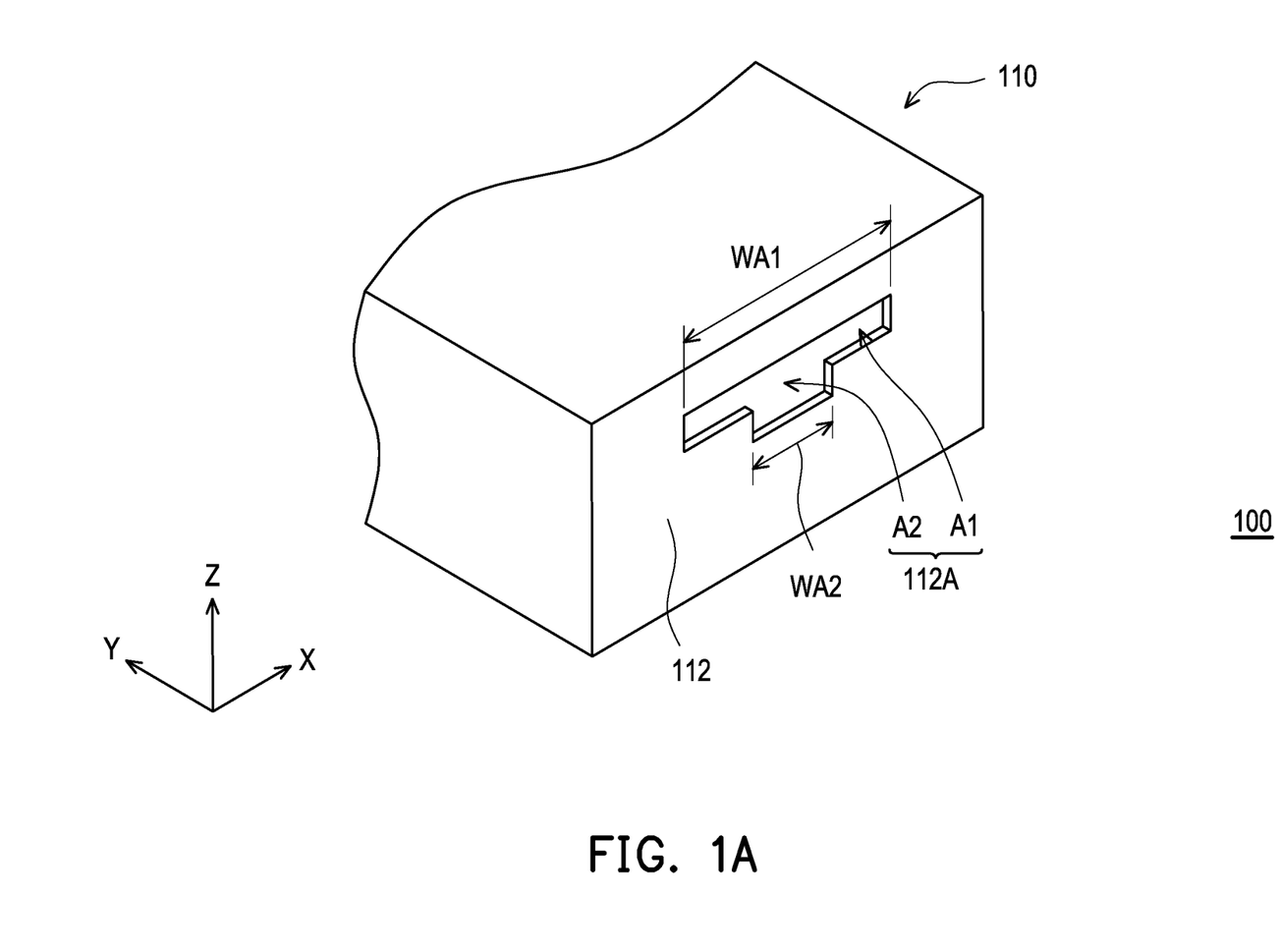
FIG. 1A to FIG. 1C are used to illustrate a method of using an electronic card receiving device according to an embodiment of the disclosure.
Figure 1B:
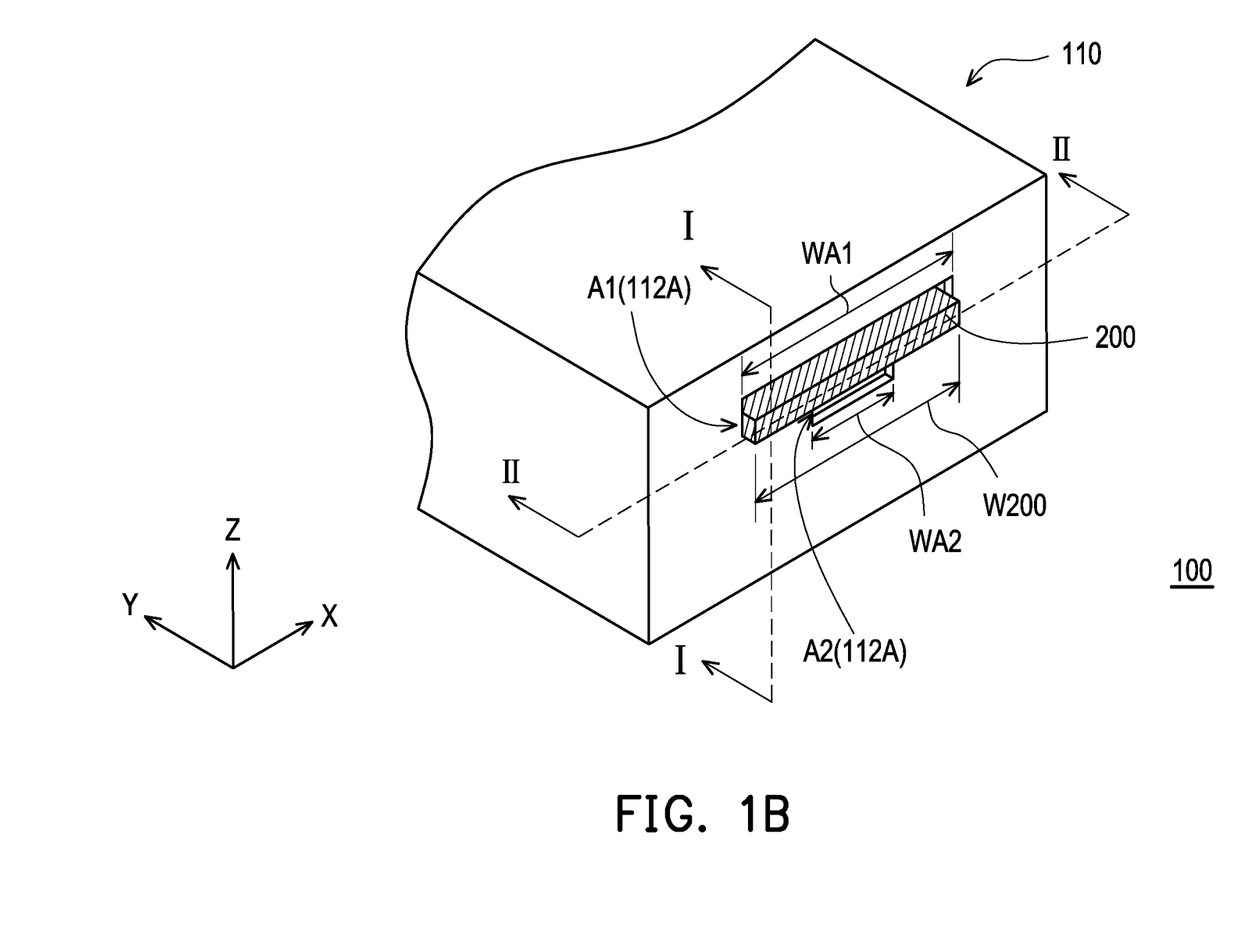
Figure 1C:
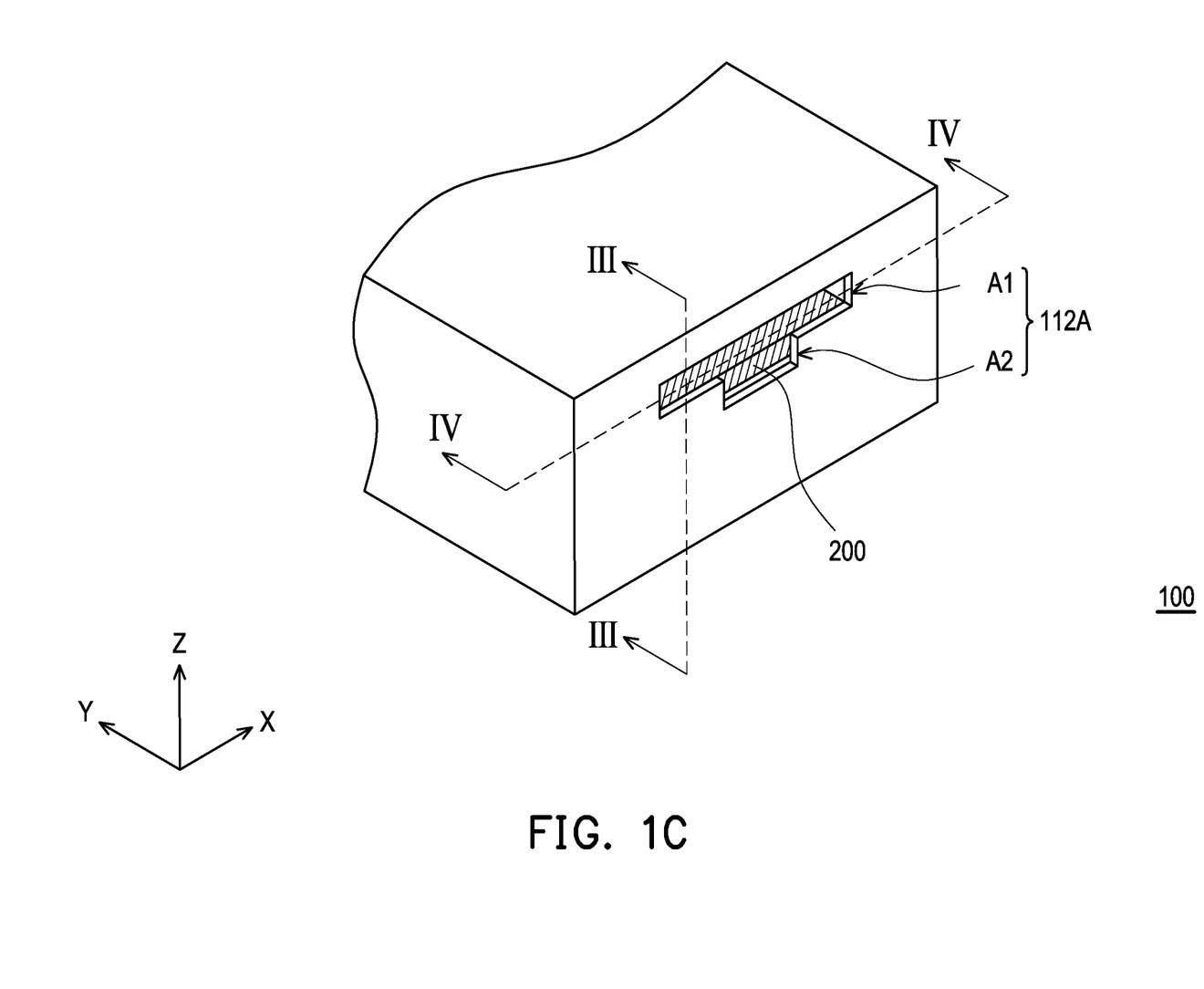

FIG. 1A to FIG. 1C are used to illustrate a method of using an electronic card receiving device according to an embodiment of the disclosure, but for the convenience of description, FIG. 1A to FIG. 1C only show a partial appearance of the electronic card receiving device. Specifically, FIG. 1A to FIG. 1C mainly show a housing 110 of an electronic card receiving device 100 and an electronic card 200 that can be inserted into the electronic card receiving device 100. In FIG. 1A, the method of using the electronic card receiving device may include firstly providing the electronic card receiving device 100. The housing 110 of the electronic card receiving device 100 includes a front plate 112, and the front plate 112 has an opening 112A. The opening 112A may include a first opening portion A1 and a second opening portion A2. A width WA1 of the first opening portion A1 is greater than a width WA2 of the second opening portion A2, and the second opening portion A2 extends downward from the first opening portion A1, for example, along a Z direction.

Next, as shown in FIG. 1B, the electronic card 200 is inserted into the housing 110 through the opening 112A. In some embodiments, the width WA1 of the first opening portion A1 may be greater than a width W200 of the electronic card 200, and the width WA2 of the second opening portion A2 may be less than the width W200 of the electronic card 200. In this way, the electronic card 200 may enter an inner space 110S of the housing 110 through the first opening portion A1 of the opening 112A without falling into the second opening portion A2.

After that, as shown in FIG. 1C, the electronic card 200 is completely inserted into the housing 110 and the electronic card 200 may be lower than the first opening portion A1 of the opening 112A. At this time, the electronic card receiving device 100 may provide an electrical signal to the electronic card 200 to update and/or read the electronic card 200. In some embodiments, the electronic card 200 is a passive card (also referred to as a passive electronic card). The power required by the electronic card 200 may be provided by the card receiving device 100. In some embodiments, the electronic card 200 may include a display panel. Information displayed by the electronic card 200 is updated by the card receiving device 100.

In addition, as shown in FIG. 1C, the second opening portion A2 may partially expose the electronic card 200 located in the housing 110. Therefore, a user may push the electronic card 200 through the second opening portion A2, so that the electronic card 200 rises to the first opening portion A1 and the electronic card 200 protrudes from the first opening portion A1 to allow the user to withdraw the electronic card 200 from the electronic card receiving device 100.

Figure 2:
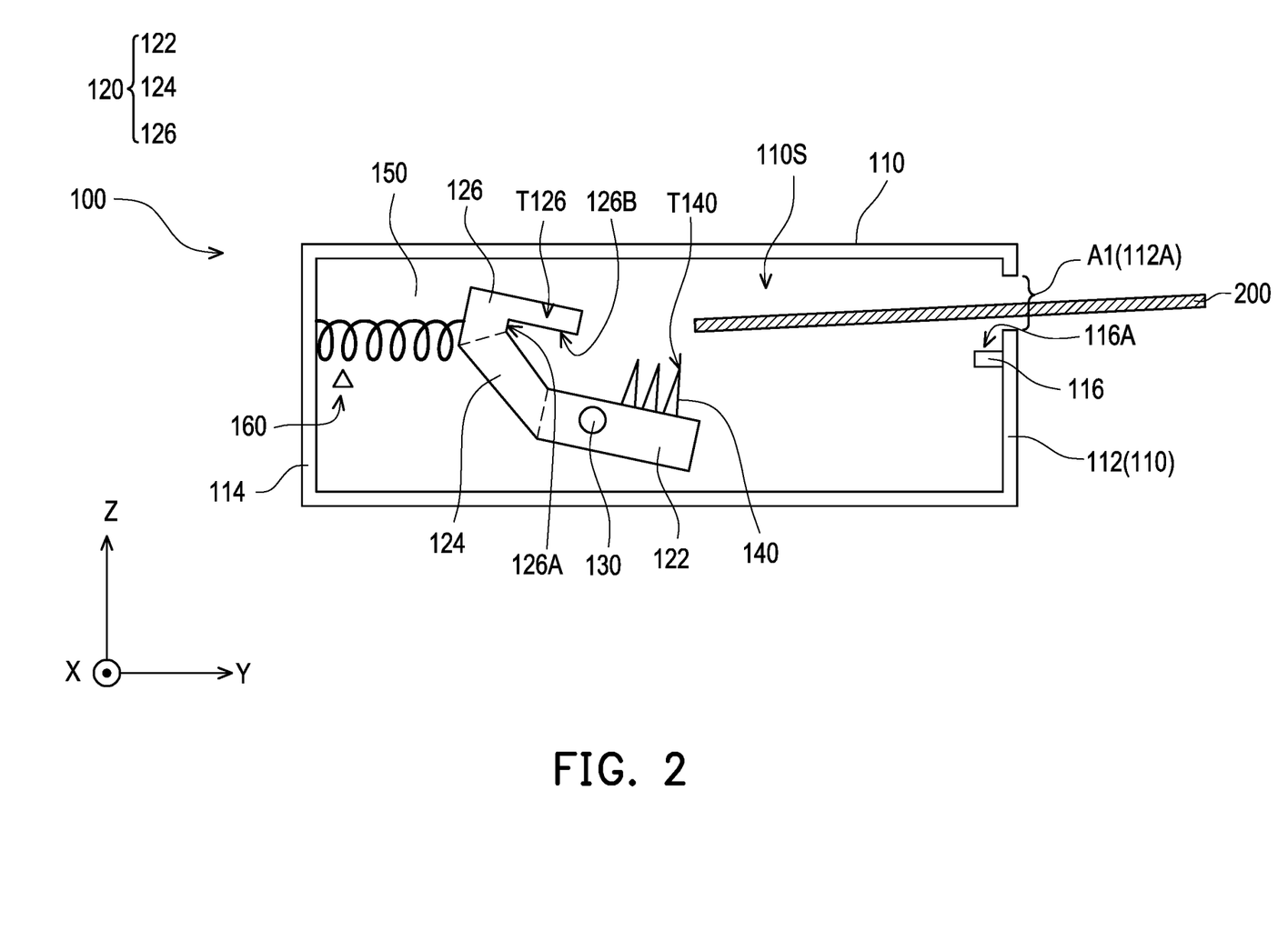
FIG. 2 is a schematic side view of an electronic card receiving device 100 in FIG. 1B after cutting along a line I-I.

FIG. 2 is a schematic side view of the electronic card receiving device 100 in FIG. 1B after cutting along a line I-I. Please refer to FIG. 1B and FIG. 2 at the same time. The electronic card receiving device 100 includes the housing 110, a card stand 120, a rotating shaft 130, and a contact element 140. The housing 110 includes a front plate 112, and the front plate 112 has the opening 112A. In the embodiment, the opening 112A has the first opening portion A1 and the second opening portion A2 as shown in FIG. 1B, but only the first opening portion A1 is shown in FIG. 2. The card stand 120 is disposed in the inner space 110S of the housing 110. The rotating shaft 130 is attached to the card stand 120 to drive the card stand 120 to oscillate. The contact element 140 is disposed on the card stand 120 and moves to different positions along with the oscillation of the card stand 120.

As can be seen from FIG. 1B and FIG. 2, the electronic card 200 may be inserted into the electronic card receiving device 100 through the opening 112A disposed on the front plate 112. Under the state of FIG. 2 and FIG. 1B, the electronic card 200 is supported by the front plate 112, for example, the edge of the first opening portion A1, and is suspended in the inner space 110S. In other words, the electronic card 200 has not yet contacted the card stand 120 at this time, so FIG. 2 shows the card stand 120 under an initial configuration.

Specifically, the card stand 120 includes a plate section 122, a connecting section 124, and a hook section 126. The plate section 122 is a portion of the card stand 120 adjacent to the front plate 112, and the hook section 126 is a portion of the card stand 120 away from the front plate 112. The connecting section 124 is connected between the plate section 122 and the hook section 126. In addition, the connecting section 124 may be bent relative to the plate section 122, so that the hook section 126 and the plate section 122 are not coplanar. A terminal T126 of the hook section 126 protrudes toward the direction of the opening 112A. In this way, the hook section 126 has an abutting surface 126A facing the front plate 112 and a blocking surface 126B having a different normal direction from the abutting surface 126A. As can be seen from FIG. 2, the plate section 122, the connecting section 124, and the hook section 126 form an approximately hook-shaped structure, but not limited thereto.

The rotating shaft 130 is attached to the plate section 122 of the card stand 120. In the embodiment, the rotating shaft 130 is lower than the opening 112A, and an axis (for example, parallel to the direction of the X axis) of the rotating shaft 130 is substantially parallel to the front plate 112. The rotation of the rotating shaft 130 may drive the card stand 120 to oscillate, so that a terminal of the plate section 122 and the hook section 126 oscillate in a seesaw manner. For example, the rotation of the rotating shaft 130 may lower the hook section 126 from the state shown in FIG. 2 (that is, an initial configuration) to a lower position and may raise the terminal of the plate section 122 from the state shown in FIG. 2 (that is, the initial configuration) to a higher position. Alternatively, the rotation of the rotating shaft 130 may raise the hook section 126 from a lower position to the state shown in FIG. 2 (that is, the initial configuration) and may lower the terminal of the plate section 122 from a higher position to the state shown in FIG. 2 (that is, the initial configuration).

The contact element 140 is disposed on the plate section 122 of the card stand 120 and specifically protrudes upward from an upper surface of the plate section 122. A top T140 of the contact element 140 may be located in different positions along with the oscillation of the card stand 120. In some embodiments, the contact element 140 may include multiple probes, and tips of the probes (that is, the top T140 of the contact element 140) are substantially coplanar.

As can be seen from FIG. 2, the electronic card receiving device 100 may further include an elastic element 150. The elastic element 150 is disposed between the housing 110 and the card stand 120, and specifically, the elastic element 150 and the front plate 112 are located on two opposite sides of the card stand 120. As shown in FIG. 2, the housing 110 may include a rear plate 114 opposite to the front plate 112, and the elastic element 150 is disposed on the rear plate 114 of the housing 110 and protrudes toward the card stand 120. The elastic element 150 is, for example, a spring or the like. Under the initial configuration shown in FIG. 2, the elastic element 150 is in an initial state without external force. The configuration position and length of the elastic element 150 may be designed, so that when the rotating shaft 130 drives the card stand 120 to oscillate, the hook section 126 of the card stand 120 may be lowered and push the elastic element 150 to compress the elastic element 150. In other words, the elastic element 150 may be compressed by the card stand 120 or maintain the initial state of not being compressed along with the configuration state of the card stand 120. In some embodiments, the elastic element 150 may be physically connected between the rear plate 114 and the card stand 120, but not limited thereto.

In addition, the electronic card receiving device 100 may further include a controllable fixing element 160. The controllable fixing element 160 is disposed in the inner space 110S of the housing 110 and may be used to fix the card stand 120. For example, the controllable fixing element 160 may provide an action force for fixing the card stand 120 to the card stand 120 under control to fix the card stand 120 in a specific orientation state. When the card stand 120 does not need to be fixed, the action force of the controllable fixing element 160 may be stopped without affecting the orientation of the card stand 120. In some embodiments, the action force provided by the controllable fixing element 160 includes a magnetic force. In some embodiments, the action force provided by the controllable fixing element 160 includes a mechanical force, an adhesive force, etc. Since the controllable fixing element 160 may be implemented in various structures, FIG. 2 only schematically represents the controllable fixing element 160 in a triangular pattern. In some embodiments, the controllable fixing element 160 may be disposed between the card stand 120 and the rear plate 114, but the disclosure is not limited thereto. In other embodiments, the controllable fixing element 160 may be disposed between the card stand 120 and other components.

In some embodiments, the housing 110 may further include a blocking protrusion 116 protruding from the front plate 112 toward the card stand 120. The blocking protrusion 116 may be located below the first opening portion A1 of the opening 112A. A top surface of the blocking protrusion 116 may serve as a blocking surface 116A. When the electronic card 200 is completely inserted into the inner space 110S of the housing 110, the blocking protrusion 116 may block the electronic card 200 to prevent falling. Therefore, when the electronic card 200 is completely inserted into the inner space 110S of the housing 110, the electronic card 200 may contact the blocking surface 116A.

Figure 3:
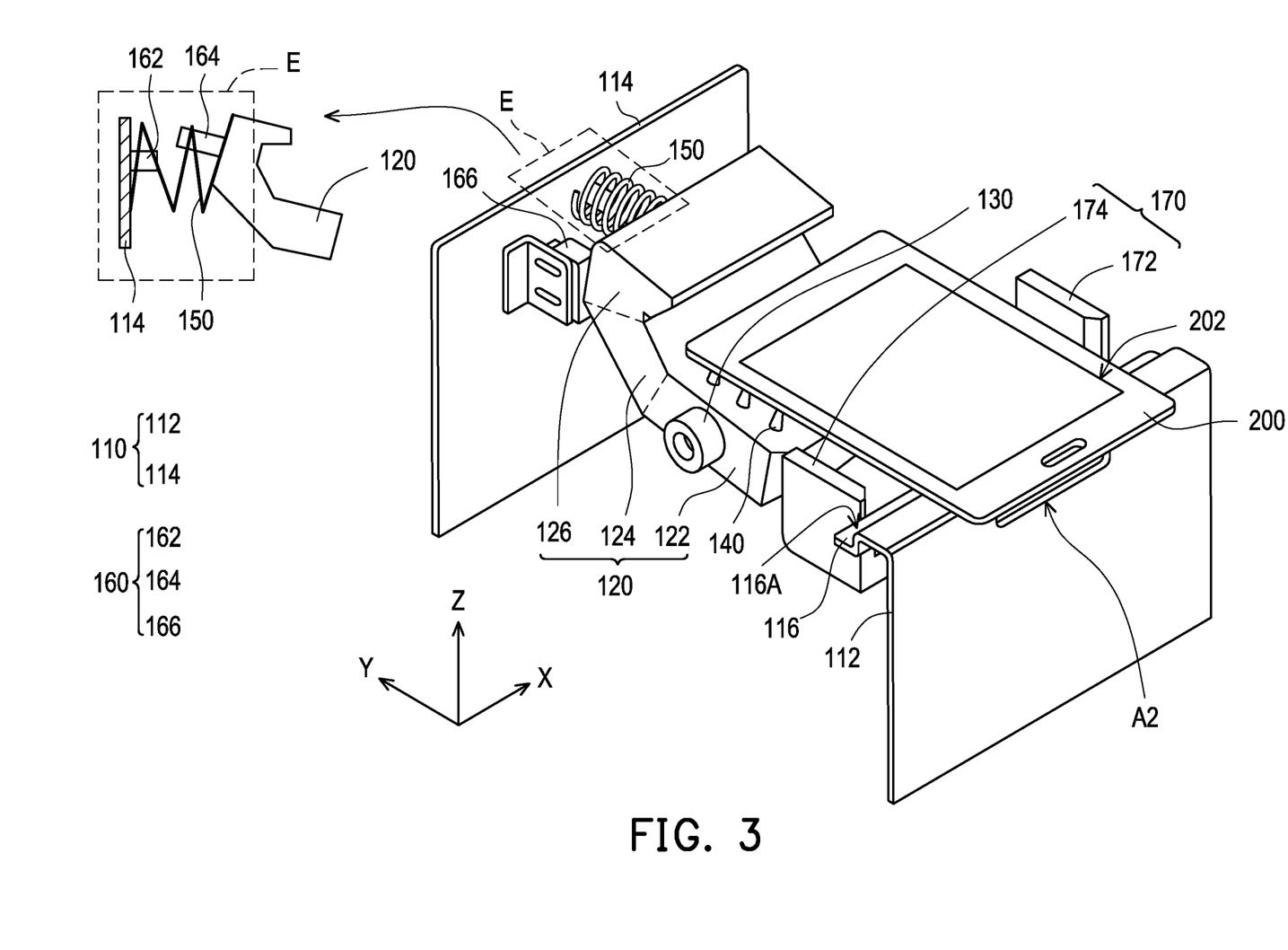
FIG. 3 is a partial perspective view of the electronic card receiving device 100 in FIG. 1B after cutting off a top surface portion along a line II-II.

FIG. 3 is a partial perspective view of the electronic card receiving device 100 in FIG. 1B after cutting off a top surface portion along a line II-II. The electronic card receiving device 100 of FIG. 3 further includes other components in addition to the components described in FIG. 2. The components denoted by the same reference numerals in FIG. 2 and FIG. 3 may be cross-referenced without repeated description. The components and corresponding structures shown in FIG. 3 are used to illustrate possible implementations of the electronic card receiving device 100, but not limited thereto. In FIG. 3, the electronic card receiving device 100 further includes a side baffle 170 in addition to the housing 110, the card stand 120, the rotating shaft 130, the elastic element 150, and the controllable fixing element 160 described in FIG. 2, and FIG. 2 exemplarily shows an implementation of the controllable fixing element 160. In addition, FIG. 3 shows that the electronic card 200 has a display surface 202 to display an information image, but not limited thereto. In some embodiments, the electronic card 200 may be an electronic paper device or other display devices that can display images without power. The electronic card 200 may be applied to an electronic label, an electronic name tag, etc.

As shown in FIG. 3, the side baffle 170 is disposed between the front plate 112 of the housing 110 and the card stand 120 and specifically includes a first baffle 172 and a second baffle 174. The first baffle 172 and the second baffle 174 are opposite to each other in the direction of the X axis. After the electronic card 200 is inserted into the housing 110, the first baffle 172 and the second baffle 174 may provide blockage to prevent the electronic card 200 from undesired excessive movement in the lateral direction (for example, the direction of the X axis), so that the electronic card 200 advances toward the hook section 126 of the card stand 120.

In addition, as can be seen from a partial enlarged area E of FIG. 3, the controllable fixing element 160 may include a first electromagnet 162 and a second electromagnet 164. The first electromagnet 162 and the second electromagnet 164 are respectively disposed on the rear plate 114 of the housing 110 and the card stand 120. The first electromagnet 162 and the second electromagnet 164 may be controlled to be excited to attract each other, which helps to provide a magnetic force to fix the state of the card stand 120. For example, when the first electromagnet 162 and the second electromagnet 164 have the magnetic force and attract each other, the configuration of the card stand 120 relative to the housing 110 may be fixed. In addition, the first electromagnet 162 and the second electromagnet 164 may be controlled to be demagnetized. In the demagnetized state, the first electromagnet 162 and the second electromagnet 164 do not exert any action force on the card stand 120 and do not affect the position and oscillation of the card stand 120. In some embodiments, the controllable fixing element 160 may include a micro switch 166 to control the magnetic phenomenon of the first electromagnet 162 and the second electromagnet 164. The micro switch 166 may be disposed between the rear plate 114 and the card stand 120, and the micro switch 166 is disposed at a position such that the card stand 120 may press or trigger the micro switch 166 by oscillating. In this way, the on and off of the micro switch 166 and the magnetic action of the first electromagnet 162 and the second electromagnet 164 may be controlled by the oscillation of the card stand 120, but not limited thereto.

Figure 4:
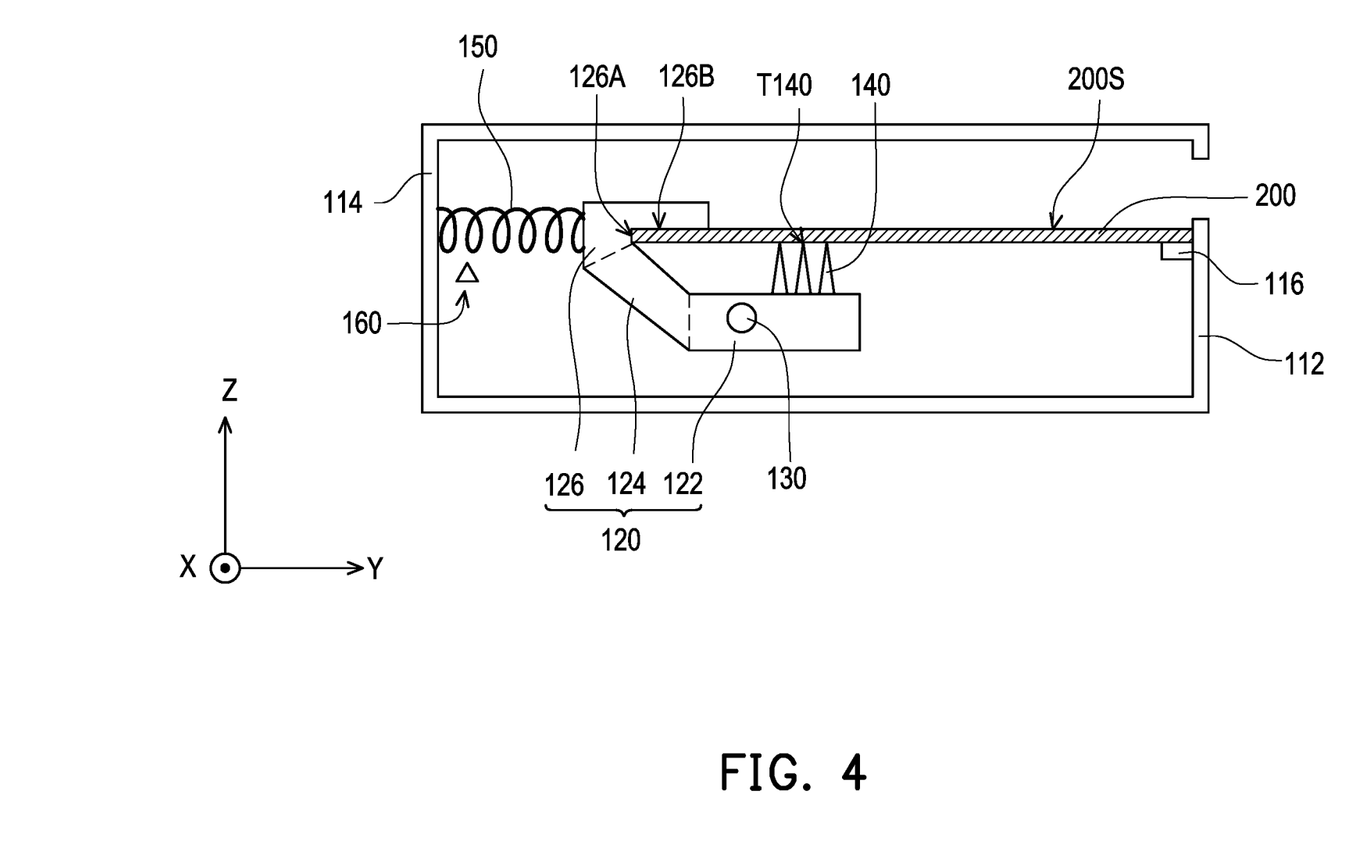
FIG. 4 is a schematic side view of the electronic card receiving device 100 in FIG. 1C after cutting along a line III-III.
Figure 5:
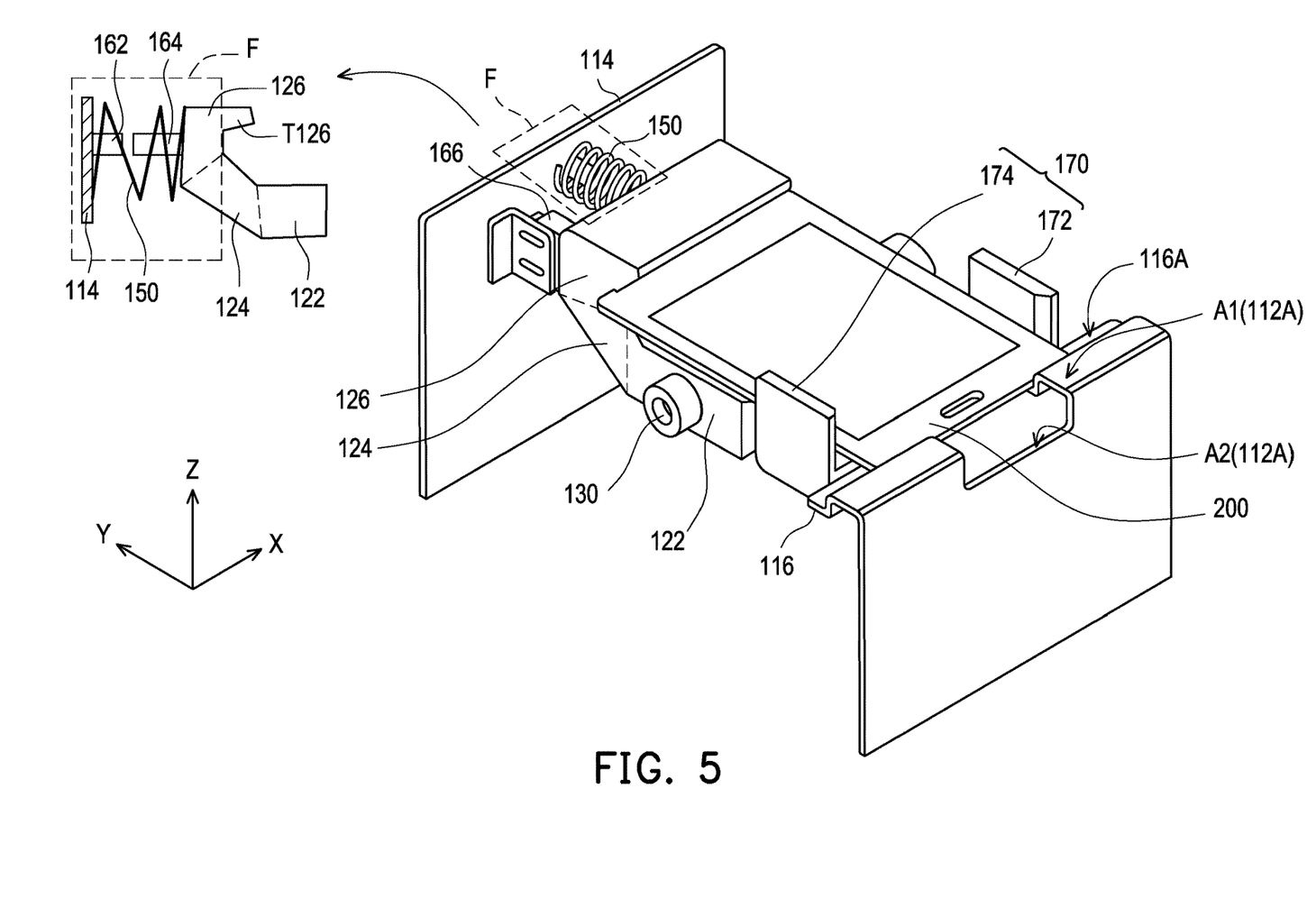
FIG. 5 is a partial perspective view of the electronic card receiving device 100 in FIG. 1C after cutting off a top surface portion along the line III-III.

FIG. 4 is a schematic side view of the electronic card receiving device 100 in FIG. 1C after cutting along a line III-III, and FIG. 5 is a partial perspective view of the electronic card receiving device 100 in FIG. 1C after cutting off a top surface portion along the line III-III. The components shown in FIG. 4 and FIG. 5 are substantially the same as those shown in FIG. 2 and FIG. 3, but the configurations of some components in FIG. 4 and FIG. 5 are different. FIG. 1C, FIG. 4, and FIG. 5 show the state of the electronic card 200 being completely inserted into the electronic card receiving device 100. When the electronic card 200 is inserted into the electronic card receiving device 100, the electronic card 200 abuts against the hook section 126 of the card stand 120 and exerts a thrust force on the hook section 126 toward the rear plate 114 along the X axis, and the thrust force rotates the rotating shaft 130 to oscillate the card stand 120. In FIG. 4 and FIG. 5, the card stand 120 is under a card-reading configuration by oscillating. In other words, the rotation of the rotating shaft 130 may drive the card stand 120 to oscillate between the initial configuration shown in FIGS. 2 and 3 and the card-reading configuration shown in FIGS. 4 and 5.

As shown in FIG. 4 and FIG. 5, the insertion manner of the electronic card 200 may be to allow the electronic card 200 to enter the inner space 110S of the housing 110 through the opening 112A and continue to push the electronic card 200, so that the electronic card 200 abuts against the hook section 126. The thrust force exerted by the electronic card 200 on the hook section 126 may drive the rotating shaft 130 to rotate to drive the card stand 120 to oscillate from the initial configuration of FIG. 2 and FIG. 3 to the card-reading configuration of FIG. 4 and FIG. 5. At this time, the electronic card 200 may be driven by the card stand 120 to be lowered from the first opening portion A1 of the opening 112A to the blocking protrusion 116 and abut between the hook section 126 and the front plate 112. At the same time, the card-reading configuration is such that the top T140 of the contact element 140 may rise to a contact position (that is, a position of the top T140 of the contact element 140 under the card-reading configuration) to contact the electronic card 200. In other words, under the initial configuration of FIG. 2 and FIG. 3, the top T140 of the contact element 140 is lower than the contact position shown in FIG. 4 and FIG. 5.

The card-reading configuration is such that the hook section 126 of the card stand 120 is at least partially higher than the contact position (that is, the position of the top T140 of the contact element 140 under the card-reading configuration), and the blocking surface 116A of the blocking protrusion 116 is approximately flush with the contact position (that is, the position of the top T140 of the contact element 140 under the card-reading configuration). Therefore, the card-reading configuration is such that the top T140 of the contact element 140, the hook section 126, the blocking protrusion 116, and the front plate 112 enclose a card receiving space 200S (which may be understood as a space enclosed by the volume of the electronic card 200 in FIGS. 4 and 5). In other words, the distance between the abutting surface 126A of the hook section 126 and an inner surface of the front plate 112 may be equal to the length of the electronic card 200. The blocking surface 126B of the hook section 126 and the blocking surface 116A of the blocking protrusion 116 may be on two opposite sides of the electronic card 200 to limit the movement of the electronic card 200 in the direction of the Z axis. In addition, the top T140 of the contact element 140 and the blocking surface 116A of the blocking protrusion 116 are located on the same side of the electronic card 200, so the contact element 140 may also provide a blocking action to prevent the electronic card 200 from falling. In some embodiments, if the contact element 140 provides sufficient blocking action, the blocking protrusion 116 may be omitted according to design requirements.

Under the card-reading configuration shown in FIGS. 4 and 5, the top T140 of the contact element 140 moves from the lower position (as shown in FIGS. 2 and 3) to the contact position along with the oscillation of the card stand 120. In other words, the card-reading configuration is such that the contact element 140 may contact the electronic card 200. In some embodiments, the contact element 140 may include multiple probes, and the probes may be conductive probes that can transmit power or electrical signals. A contact pad may be disposed on a surface of the electronic card 200 contacted by the contact element 140 to allow the electronic card 200 to receive the power or the electrical signal provided by the contact element 140 through the contact pad. In other words, the electronic card receiving device 100 provides the electrical signal to the electronic card 200 through the contact element 140. In some embodiments, the contact element 140 may only contact the electronic card 200 under the card-reading configuration. In this way, a contact time between the contact element 140 and the electronic card 200 is not long, which helps to reduce the possibility of the contact element 140 scratching the electronic card 200 (the contact pad). Therefore, the electronic card 200 may be repeatedly updated or charged by using the electronic card receiving device 100 without easily damaging the electronic card 200.

As can be seen from FIG. 4 and FIG. 5, the card-reading configuration is such that the card stand 120 compresses the elastic element 150, and the card stand 120 may press or trigger the micro switch 166. Therefore, the card-reading configuration allows the first electromagnet 162 and the second electromagnet 164 to be excited and attract each other. The magnetic attraction of the first electromagnet 162 and the second electromagnet 164 enables the card stand 120 to be maintained under the card-reading configuration, which helps to prevent the contact element 140 from moving while contacting the electronic card 200. In other words, the card-reading configuration allows the card stand 120 to maintain the electronic card 200 between the hook section 126 and the front plate 112 of the housing 110 and maintain the position of the contact element 140 contacting the electronic card 200. Therefore, the card stand 120 may be maintained under the card-reading configuration for a sufficient time to allow updating or charging the electronic card 200 without easily scratching the electronic card 200.

As can be seen from FIG. 5 and FIG. 1C, although the electronic card 200 is completely located in the electronic card receiving device 100, the electronic card 200 may be partially exposed by the second opening portion A2 of the opening 112A. Therefore, after the electronic card 200 is fully updated or charged, the user may push the electronic card 200 through the second opening portion A2 to move the electronic card 200 to the first opening portion A1 and leave the electronic card receiving device 100 through the opening 112A. For example, the user may exert a thrust force on the electronic card 200 through the second opening portion A2 toward the hook section 126 along the direction of the Y axis, and exert a lifting force toward the first opening portion A1 along the Z axis. In this way, the reaction force caused by the compression of the elastic element 150 may provide a force for the hook section 126 of the card stand 120 to move toward the front plate 112, which pushes the electronic card 200 toward the first opening portion A1 at the same time. In this way, the electronic card 200 may be withdrawn from the first opening portion A1 and the state thereof may be as shown in FIG. 2 and FIG. 3. After that, the user may hold a portion of the electronic card 200 exposed by the first opening portion A1 and move the electronic card 200 away from the electronic card receiving device 100.

During the process of removing the electronic card 200, the reaction force caused by the compression of the elastic element 150 may push the hook section 126 of the card stand 120 away from the rear plate 114. Along with the movement of the hook section 126 away from the rear plate 114, the elastic element 150 may be restored from the compressed state to the initial state, and the micro switch 166 may also be restored to the original state (not pressed or not triggered). In this way, the first electromagnet 162 and the second electromagnet 164 are demagnetized without exerting an action force on the card stand 120. During such a process, the rotating shaft 130 may be rotated to drive the card stand 120 to oscillate from the card-reading configuration to the initial configuration, so that the top T140 of the contact element 140 is lowered from the contact position and leaves the electronic card 200. Therefore, the top T140 of the contact element 140 does not contact the electronic card 200 during the card removal process, which helps to prevent the electronic card 200 from being scratched by the contact element 140.

Figure 6:
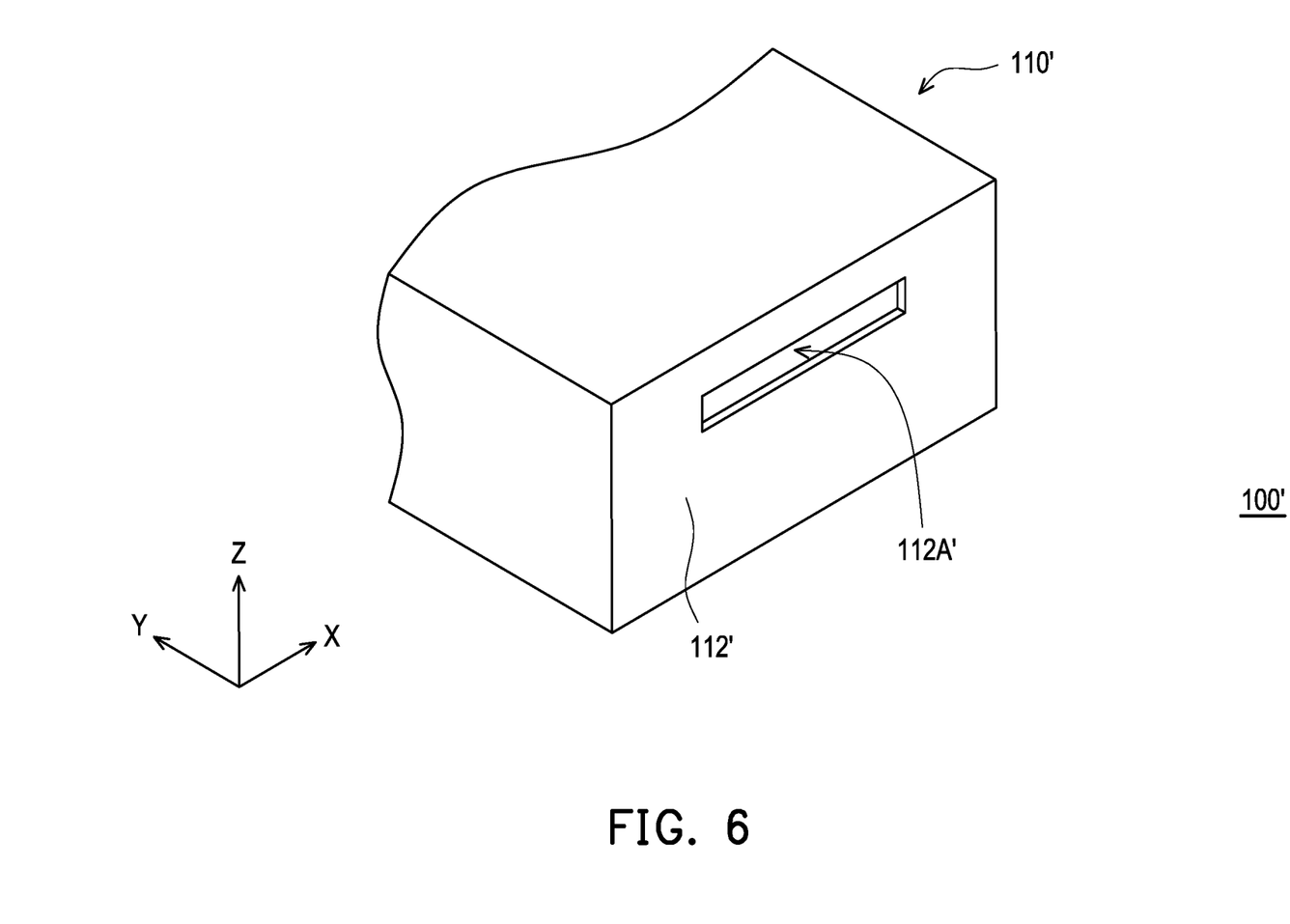
FIG. 6 is a partial appearance of an electronic card receiving device according to an embodiment of the disclosure.
Figure 7:
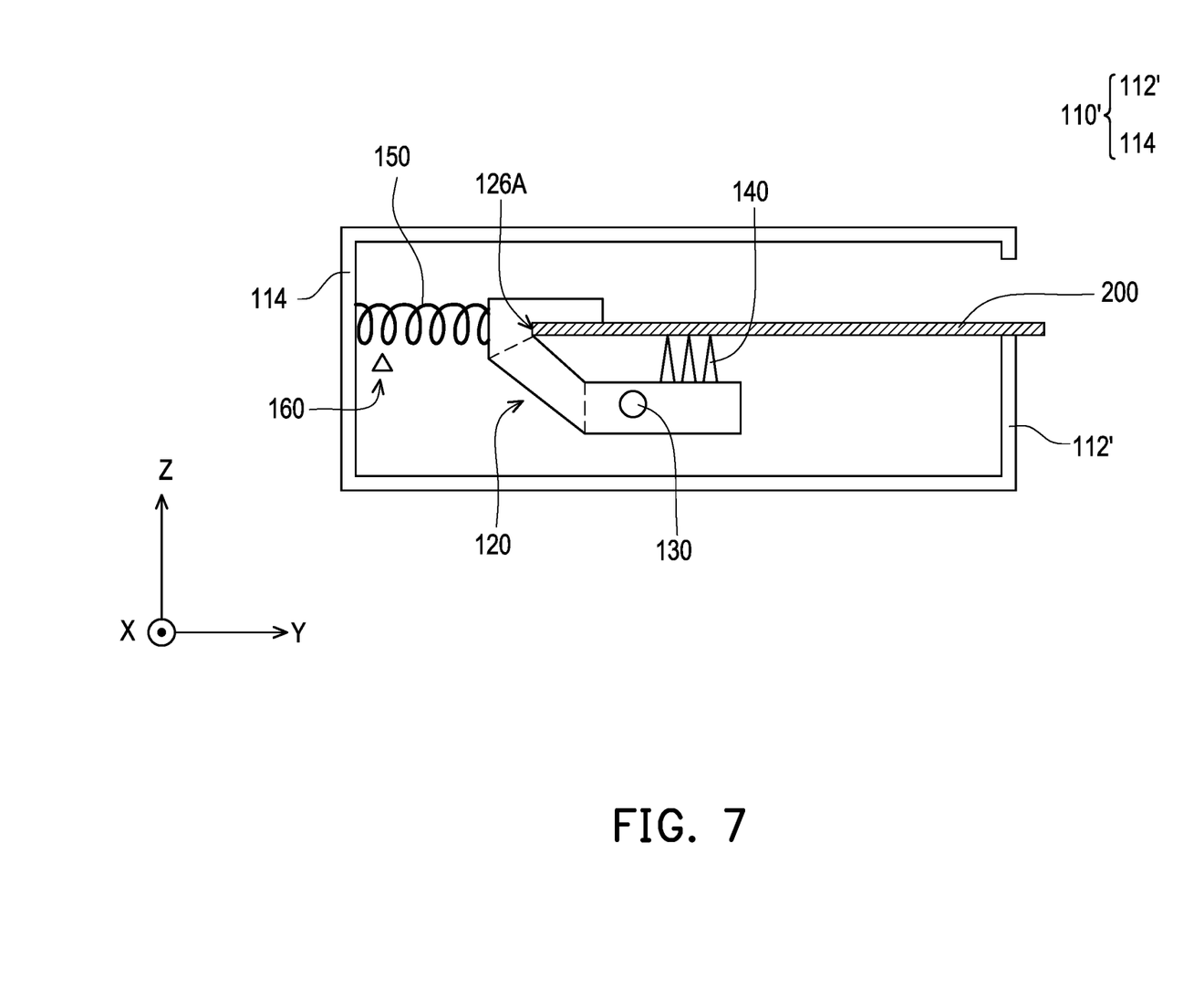
FIG. 7 is a schematic side view of the electronic card receiving device of FIG. 6 after cutting.

FIG. 6 is a partial appearance of an electronic card receiving device according to an embodiment of the disclosure, and FIG. 7 is a schematic side view of the electronic card receiving device of FIG. 6 after cutting. FIG. 6 mainly shows a housing 110' of an electronic card receiving device 100' and FIG. 7 mainly shows a state of an electronic card 200 inserted into the electronic card receiving device 100'. As shown in FIG. 6 and FIG. 7, the electronic card receiving device 100' includes a housing 110', a card stand 120, a rotating shaft 130, a contact element 140, an elastic element 150, and a controllable fixing element 160. In the embodiment, the electronic card receiving device 100' is substantially the same as the electronic card receiving device 100. Therefore, for the structural designs, functions, and actions of the card stand 120, the rotating shaft 130, the contact element 140, the elastic element 150, and the controllable fixing element 160, reference may be made to the description of the foregoing embodiment. In the embodiment, the housing 110' has a front plate 112' and a rear plate 114, and the front plate 112' has an opening 112A'. Different from the foregoing embodiments, the opening 112A' is a rectangular opening and may allow the insertion and removal of an electronic card. For example, as shown in FIG. 7, after the electronic card 200 is inserted into the electronic card receiving device 100' through the opening 112A', the electronic card 200 may abut against an abutting surface 126A of the card stand 120, so that the card stand 120 is under a card-reading configuration to allow the contact element 140 to contact the electronic card 200. In addition, under the card-reading configuration, the distance between the abutting surface 126A of the card stand 120 and the front plate 112' may be less than the length of the electronic card 200, so the electronic card 200 may be partially exposed by the opening 112A' and supported by a lower edge B112A' of the opening 112A'. After updating, charging, and/or reading the electronic card 200, the user may directly hold an exposed portion of the electronic card 200 to remove the electronic card 200 and allow the card stand 120 to restore to an initial configuration.

In summary, the electronic card receiving device of the embodiments of the disclosure has the card stand that may oscillate in a seesaw manner. The contact element on the card stand only contacts the electronic card when the card stand oscillates to the card-reading configuration. Therefore, although the electronic card receiving device needs to contact the electronic card for updating, charging, or reading, the electronic card cannot be easily scratched due to the procedures. Therefore, the electronic card receiving device and the method of using the same can improve the issue of damage to an electronic card with a contact-type design.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic card receiving device, comprising:
   a housing, comprising a front plate, wherein the front plate has an opening;
   a card stand, disposed in an inner space of the housing and comprising a plate section, a connecting section, and a hook section, wherein the connecting section is connected between the plate section and the hook section, and a terminal of the hook section protrudes toward a direction of the opening;
   a first electromagnet and a second electromagnet, respectively disposed on the housing and the card stand;
   a rotating shaft, attached to the plate section of the card stand, wherein the rotating shaft is lower than the opening, an axis of the rotating shaft is substantially parallel to the front plate, and rotation of the rotating shaft drives the card stand to oscillate between an initial configuration and a card-reading configuration; and
   a contact element, disposed on the plate section of the card stand, wherein the card-reading configuration is such that a top of the contact element is in a contact position and the initial configuration is such that the top of the contact element is lower than the contact position.

2. The electronic card receiving device according to claim 1, wherein the contact element comprises a plurality of probes, and tips of the probes are substantially coplanar.

3. The electronic card receiving device according to claim 1, wherein the card-reading configuration is such that the hook section is higher than the contact position.

4. The electronic card receiving device according to claim 1, wherein the housing comprises a blocking protrusion, protruding from the front plate toward the card stand, and a blocking surface of the blocking protrusion is approximately flush with the contact position.

5. The electronic card receiving device according to claim 4, wherein the card-reading configuration is such that the top of the contact element, the hook section, the blocking protrusion, and the front plate enclose a card receiving space.

6. The electronic card receiving device according to claim 1, further comprising an elastic element, disposed between the housing and the card stand, wherein the elastic element and the front plate are located on two opposite sides of the card stand.

7. The electronic card receiving device according to claim 6, wherein the card stand is under the card-reading configuration such that the elastic element is compressed by the card stand.

8. The electronic card receiving device according to claim 1, further comprising a micro switch, disposed between the housing and the card stand, wherein the micro switch and the opening are located on two opposite sides of the card stand, and the micro switch is suitable for controlling magnetism of the first electromagnet and the second electromagnet.

9. The electronic card receiving device according to claim 8, wherein the card-reading configuration is such that the micro switch is pressed by the card stand and allows the first electromagnet and the second electromagnet to be excited and attract each other.

10. The electronic card receiving device according to claim 8, wherein the card stand is under the initial configuration such that the micro switch is not pressed, so that the first electromagnet and the second electromagnet are demagnetized.

11. The electronic card receiving device according to claim 8, wherein the opening has a first opening portion and a second opening portion, a width of the first opening portion is greater than a width of the second opening portion, and the second opening portion extends downward from the first opening portion.

12. The electronic card receiving device according to claim 1, wherein the electronic card receiving device is suitable for receiving an electronic card and the card-reading configuration allows the card stand to maintain the electronic card between the hook section and the front plate of the housing and enables the contact element to contact the electronic card.

13. The electronic card receiving device according to claim 12, wherein the electronic card is a passive electronic card, and the electronic card receiving device is suitable for providing an electrical signal to the electronic card through the contact element.

14. The electronic card receiving device according to claim 13, wherein under the card-reading configuration, the electronic card is partially exposed by the opening and is supported by a lower edge of the opening.

15. A method of using an electronic card receiving device, comprising:
   providing the electronic card receiving device, comprising:
   a housing, comprising a front plate, wherein the front plate has an opening;
   a card stand, disposed in an inner space of the housing and comprising a plate section, a connecting section, and a hook section, wherein the connecting section is connected between the plate section and the hook section, and a terminal of the hook section protrudes toward a direction of the opening;
   a first electromagnet and a second electromagnet, respectively disposed on the housing and the card stand;
   a rotating shaft, attached to the plate section of the card stand, wherein the rotating shaft is lower than the opening, and an axis of the rotating shaft is substantially parallel to the front plate; and
   a contact element, disposed on the plate section of the card stand;
   inserting an electronic card into the inner space of the housing through the opening; and
   pushing the electronic card to abut against the hook section to rotate the rotating shaft to drive the card stand to oscillate from an initial configuration to a card-reading configuration, so that a top of the contact element rises to a contact position to contact the electronic card.

16. The method of using the electronic card receiving device according to claim 15, further comprising pushing the electronic card through the opening after the card stand is under the card-reading configuration, so that the electronic card leaves the electronic card receiving device through the opening and the rotating shaft is rotated to drive the card stand to oscillate from the card-reading configuration to the initial configuration, so that the top of the contact element is lowered from the contact position and leaves the electronic card.

17. The method of using the electronic card receiving device according to claim 15, wherein the card stand oscillates from the initial configuration to the card-reading configuration to drive the electronic card as a whole to enter the inner space of the housing through the opening and abut between the hook section and the front plate.

18. The method of using the electronic card receiving device according to claim 15, wherein under the card-reading configuration, the electronic card receiving device provides an electrical signal to the electronic card through the contact element.

19. The method of using the electronic card receiving device according to claim 18, further comprising exerting an external force on the electronic card through the opening to rotate the rotating shaft to drive the card stand to oscillate from the card-reading configuration to the initial configuration, so that the top of the contact element is lowered from the contact position and leaves the electronic card, so that the electronic card is exposed by the opening and leaves the electronic card receiving device.

* * * * *